United States Patent [19]

Mizutani et al.

[11] Patent Number: 4,648,695
[45] Date of Patent: Mar. 10, 1987

[54] ILLUMINATION APPARATUS FOR TESTING PHOTOELECTRIC TRANSDUCER DEVICE

[75] Inventors: Norio Mizutani, Kawasaki; Toshiyuki Kasai, Matsudo, both of Japan

[73] Assignee: Nippon Kogaku K.K., Tokyo, Japan

[21] Appl. No.: 636,838

[22] Filed: Aug. 1, 1984

[30] Foreign Application Priority Data

Aug. 10, 1983 [JP] Japan ................................ 58-146144
May 22, 1984 [JP] Japan ................................ 59-102809

[51] Int. Cl.⁴ ............................................. G03B 21/20
[52] U.S. Cl. ........................................ 353/28; 353/85; 353/88; 353/102; 353/38; 353/97
[58] Field of Search ..................... 353/28, 122, 88, 85, 353/121, 62, 102, 97, 98; 362/268

[56] References Cited

U.S. PATENT DOCUMENTS

| | | | |
|---|---|---|---|
| 3,019,704 | 2/1962 | Zillmer | 353/88 X |
| 3,246,562 | 4/1966 | Cooper et al. | 353/122 X |
| 3,296,923 | 1/1967 | Miles . | |
| 4,497,105 | 1/1985 | Konno et al. | 353/38 X |

Primary Examiner—Harry N. Haroian
Attorney, Agent, or Firm—Shapiro and Shapiro

[57] ABSTRACT

An illumination apparatus for testing photoelectric devices such as solid-state image sensors is capable of easily switching between sufficient uniform illumination and high-luminance spot illumination at high speed, and of performing various types of measurements by switching on/off various types of optical elements. The illumination apparatus has a main optical system for uniformly illuminating a test chart which is projected on a solid-state image sensor and an auxiliary optical system for supplying auxiliary light rays to the main optical system so as to achieve high-luminance spot illumination. The auxiliary optical system is detachably mounted with respect to the main optical system.

11 Claims, 7 Drawing Figures

ILLUMINATION APPARATUS FOR TESTING PHOTOELECTRIC TRANSDUCER DEVICE

BACKGROUND OF THE INVENTION

1. Field of the Invention

The present invention relates to an illumination apparatus for testing a photoelectric transducer device.

2. Description of the Prior Art

Recently, solid-state image sensor devices such as a CCD (charge-coupled device) have become highly developed. This has led to a demand for a high-performance illumination optical system for testing such devices. Such an illumination optical system must first provide uniform light illumination. Second, the illumination optical system must have a high-resolution imaging unit for highly precisely testing small pixels of a solid-state image sensor. Third, the illumination optical system must have a function to vary the intensity of light and a function to switch test patterns at high speed. Various conventional techniques have been proposed to achieve uniform light illumination by a method using a diffusing plate or an integrating sphere, a Köhler illumination method using a microscope or the like. However, it is difficult to obtain uniform illumination having an error within several percentages. In addition, uniformity of emission illuminance distribution is generally limited, so that the light rays used for uniform illumination must be constituted by a minimum range of light rays. However, since the effective numerical aperture NA of a projection optical system is decreased, sufficient resolution cannot generally be provided. Uniform illumination has a contradictory relationship with high resolution. It is difficult to satisfy both uniform illumination and high resolution. In general, high-speed operation must accompany a compact arrangement of various optical elements and the illumination optical system. In order to test various types of optical elements, high-luminance spot illumination as well as uniform illumination is required. Demand has arisen for an apparatus which may be easily switched between uniform illumination and high-luminance spot illumination at high speed. In order to incorporate an illumination apparatus of this type in a fabrication line of semiconductor elements such as solid-state image sensors, the illumination apparatus as a whole must be small in size.

SUMMARY OF THE INVENTION

It is an object of the present invention to provide a compact illumination apparatus capable of testing photoelectric elements such as solid-state image sensors and easily switching between sufficient uniform illumination and high-luminance spot illumination at high speed, and of performing various types of measurements by switching on/off various types of optical elements.

According to the present invention, there is provided an illumination apparatus having a main optical system for uniformly illuminating a test chart which is projected on a solid-state image sensor and an auxiliary optical system for supplying auxiliary light rays to the main optical system so as to achieve high-luminance spot illumination.

DESCRIPTION OF THE PREFERRED EMBODIMENTS

An illumination apparatus with a projection objective lens for projecting a test chart on a photoelectric transducer device to be tested comprises: a main optical system having a light source, a collimator lens for converting light rays from the light source to collimated light rays, an optical integrator arranged in the collimated light rays so as to form a plurality of secondary images of the light source, and a condenser lens for focusing the plurality of secondary images of the light source on an entrance pupil of the projection objective lens; and an auxiliary optical system having a reflecting member for focusing other light rays excluding the light rays incident on the collimator lens and directing these other light rays in the main optical system. The auxiliary optical system is detachably mounted with respect to the main optical system. When the auxiliary optical system is not used, only the light rays incident on the collimator lens are guided to an object surface and the projection objective lens through the main optical system so as to achieve uniform illumination. However, when the auxiliary optical system is used, even the light components, among the light rays emitted from the light source, which are not directly incident on the collimator lens are directed to the main optical system thereby performing high-luminance spot illumination.

The present invention will be described in detail with reference to preferred embodiments taken in conjunction with the accompanying drawings.

Figure 1:
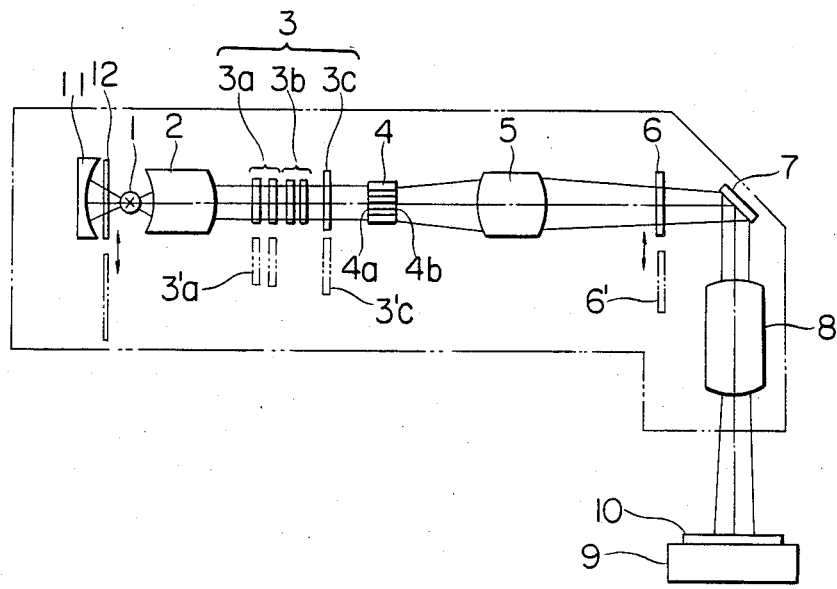
FIG. 1 is a schematic representation of an optical system in an illumination apparatus according to a first embodiment of the present invention.
Figure 2:
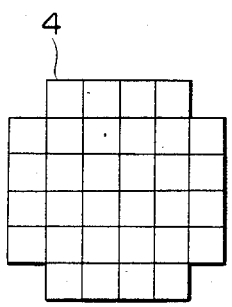
FIG. 2 is a plan view of an optical integrator.
Figure 3:
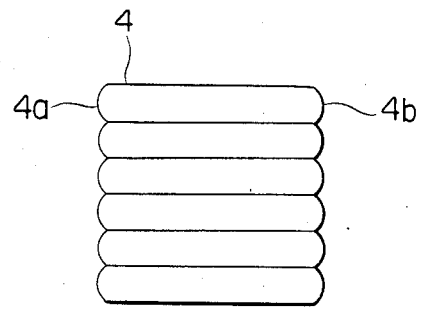
FIG. 3 is a side view of the optical integrator.

FIG. 1 is a schematic representation of an optical system of an illumination apparatus according to a first embodiment of the present invention. Light rays from a light source 1 are collimated by a collimator lens 2 to collimated rays which are incident on an optical integrator 4 through various filters 3. This optical integrator 4 comprises a number of quadrangular prisms as illustrated in the plan view of FIG. 2 and the side view of FIG. 3. Each quadrangular prism has two end faces of a convex shape and serves as a lens. The focal point of an entrance convex surface 4a substantially coincides with an exit convex surface 4b. A plurality of secondary images of the light source corresponding to the number of prisms are formed on the exit convex surfaces 4b of the optical integrator 4. The light rays from these secondary light source images are focused by a condenser lens 5 on an entrance pupil of a projection objective lens 8 through a test chart 6 and a reflecting mirror 7. Therefore, so-called Köhler illumination is performed on the test chart 6. The entrance convex surfaces 4a of the optical integrator 4 are conjugate with the test chart 6 as an illuminated object with respect to the exit convex surfaces 4b and the condenser lens 5. The images on the entrance convex surfaces 4a of the quadrangular prisms are projected onto the rectangular test chart 6 in an overlapped manner. Therefore, the chart 6 can be extremely uniformly illuminated. A predetermined pattern formed on the test chart 6 is projected by the projection objective lens 8 on a light-receiving surface of a solid-state image sensor 10 placed on a stage 9 as the illuminated object.

Figure 4:
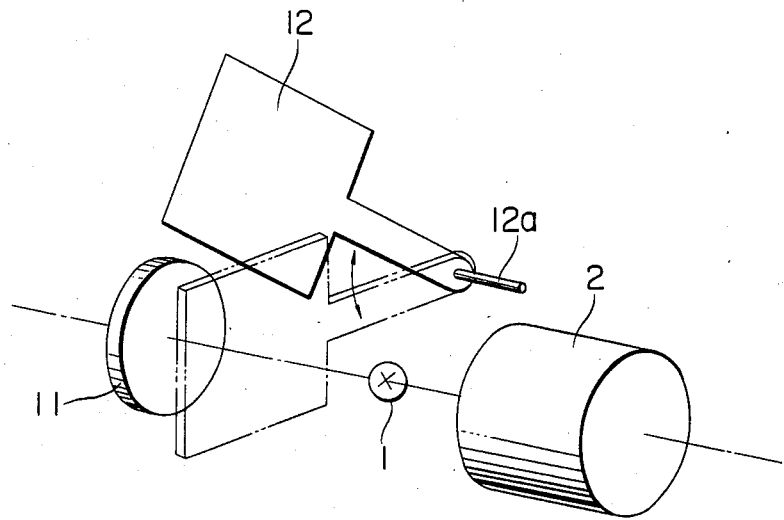
FIG. 4 is a perspective view of an auxiliary optical system for high-luminance spot illumination.

A concave mirror 11 is arranged behind the collimator lens 2, i.e., opposite to the collimator lens 2 with respect to the light source 1. A light-shielding plate 12 is detachably inserted in an optical path between the concave mirror 11 and the light source 1. As shown in the perspective view of FIG. 4, the light-shielding plate 12 comprises a rotary shutter blade which is rotatable about a rotating shaft 12a. The insertion/removal (i.e., optical path switching) of the light-shielding plate 12 can be performed at high speed. The light rays directly incident on the collimator lens 2 provide uniform illumination of the test chart 6 and the solid-state image sensor 10. An optical path from the light source 1 to the projection objective lens 8 constitutes the main optical system for uniform illumination. When the light-shielding plate 12 is removed from the optical path, an auxiliary optical system is added to the main optical path by the concave mirror 11, thereby performing high-luminance illumination.

As previously described, the improvement in uniform illumination has the contradictory relationship with the improvement in high resolution by increasing the numerical aperture NA of the imaging light rays. However, according to the present invention, the main optical system has the above arrangement to achieve a balance between uniform illumination and high-luminance illumination. More specifically, a light-emitting section of the light source 1 has a substantially square shape. The light rays from the light source 1 are used to form a number of secondary light source images by the optical integrator 4. In addition, the entrance convex surfaces of the prisms constituting the optical integrator are arranged to project light rays on the rectangular test chart in an overlapped manner, thereby achieving uniform illumination. Furthermore, the projection resolution of the chart on the solid-state image sensor 10 by means of the projection objective lens 8 can be kept sufficiently high.

In the main optical system for uniformly illuminating the test chart 6 and the solid-state image sensor 10 as an element subjected to testing, wavelength selection filters 3a in the various filters can be replaced with wavelength selection filters 3a' for selecting a wavelength different from that of the filters 3a. In addition, an ND filter 3c for changing the quantity of light can also be replaced with another ND filter 3c' having a change rate different from that of the ND filter 3c. A pair of wedge filters 3b for continuously changing the intensity can perform fine adjustment of the amount of light without impairing the uniformity of light rays. The test chart 6 can also be replaced with another test chart 6'. Therefore, when a given test chart is projected on the solid-state image sensor, optical characteristics corresponding to the three primaries, sensitivity upon continuous change in amount of light with respect to the respective wavelengths, and resolution characteristics can be tested in accordance with resolution measurements in a visible light range and the wavelength selection filters. Therefore, various tests can be performed while a predetermined test chart is uniformly illuminated.

Figure 5:
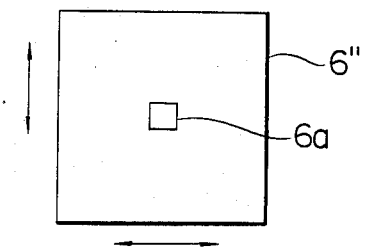
FIG. 5 is a plan view of a test chart.

When a high-luminance spot illumination is required, the light-shielding plate 12 is removed from the optical path. The light components from the light source which are not directly incident on the collimator lens 2 are reflected by the concave mirror 11 and become incident on the lens 2 so as to supply a maximum amount of light to the collimator lens 2. As a result, the high-luminance illumination of the test chart 6 and the solid-state image sensor 10 is performed. In this high-luminance illumination, the light-shielding plate 12 is removed from the optical path, and a spot illumination chart 6" having a rectangular small opening illustrated in the plan view of FIG. 5 is used as the test chart 6. The spot illumination chart 6" can be arbitrarily moved by a suitable means (not shown) in any direction within the surface of the chart. By moving the chart, a light spot is formed on any position of the solid-state image sensor 10 so as to perform blooming and smear phenomenon tests at such position.

A simplest means as the high-luminance illumination concave mirror 11 is spherical mirror. However, the concave mirror 11 is not limited to the spherical mirror. The concave mirror can be arranged such that the center of the radius of curvature is aligned with the light-emitting section or is misaligned with the optical axis. However, when the concave mirror is arranged in a decentered manner, uniform illumination is impaired even if a high-luminance light spot is formed. Therefore, it is preferred that the concave mirror is not decentered. In the above embodiment, the light-shielding plate which constitutes the auxiliary optical system is detachably mounted with respect to the optical path. However, a concave reflecting mirror can be detachably arranged with respect to the optical path.

Figure 6:
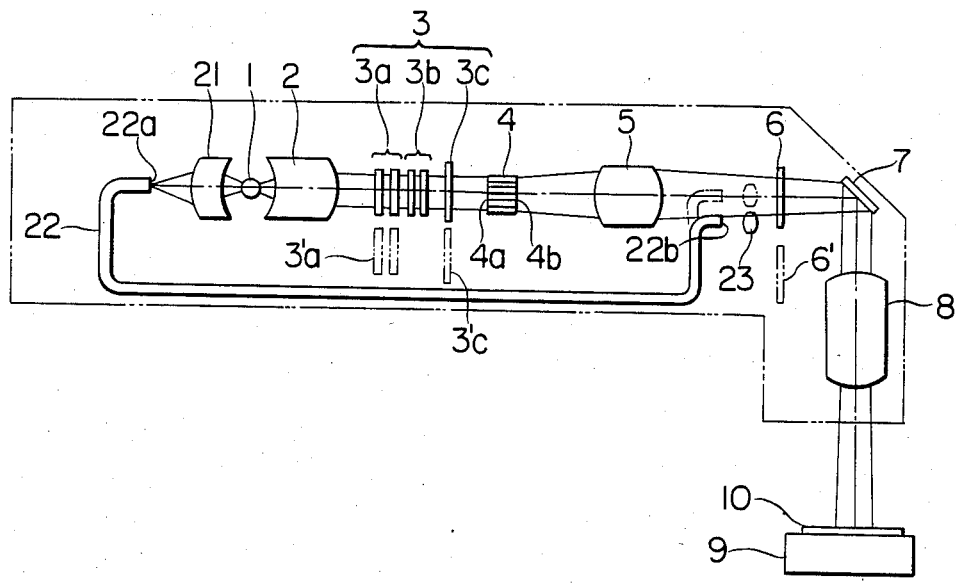
FIG. 6 is a schematic representation of an optical system in an illumination apparatus according to a second embodiment of the present invention.

FIG. 6 shows an illumination apparatus according to a second embodiment of the present invention. A main optical system from a light source 1 and a collimator lens 2 to a test chart 6 and a projection objective lens 8, as shown in FIG. 6, is substantially the same as that of the first embodiment in FIG. 1, and a detailed description thereof will be omitted. An auxiliary optical system according to the second embodiment has an optical guide 22 for guiding to the test chart 6 light components which exclude the light rays incident on the collimator lens 2 from the light source 1. The uniform illumination by the main optical system and the high-luminance spot illumination by the auxiliary optical system having the optical guide are selectively used. As shown in FIG. 6, the light rays from the optical source 1 are focused by a first focusing lens 21 on an entrance surface 22a of the optical guide 22 such as optical fibers or the like. The light rays from an exit surface 22b of the optical guide 22 opposing the test chart 6 are focused on the test chart 6 through a second focusing lens 23, thereby performing high-luminance spot illumination. The exit surface 22b of the optical guide 22 and the second focusing lens 23 are detachably arranged in an integral manner with respect to the optical path of the main optical system. The auxiliary optical system illuminates the test chart and the solid-state image sensor, instead of the main optical system, when high-luminance spot illumination is required.

Figure 7:
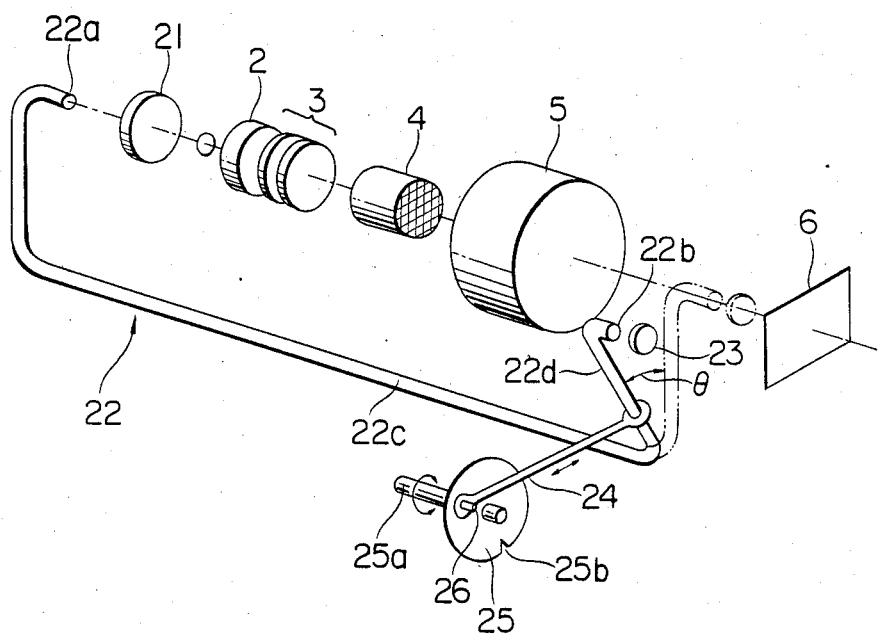
FIG. 7 is a perspective view of an auxiliary optical system for high-luminance spot illumination in the illumination apparatus shown in FIG. 6.

FIG. 7 is a perspective view showing the main part of the main and auxiliary optical systems in the illumination apparatus. The same reference numerals as in FIG. 7 denote the same parts in FIGS. 1 to 6. Some members such as the reflecting mirror and the projection objective lens are omitted. As shown in FIG. 7, the optical guide 22 has a relatively long straight portion 22c parallel to the optical axis of the main optical system so as to guide through the first focusing lens 21 the light rays directed opposite to those guided from the light source 1 to the test chart 6. A distal end portion of an arm 22d extending substantially perpendicular to the straight portion 22c is bent at right angle to constitute the exit surface 22b so as to oppose the test chart 6. The second focusing lens 23 is arranged and moved together with the exit surface 22b in a synchronized manner. When the arm 22d and the second focusing lens 23 are integrally rotated about the straight portion 22c of the optical guide 22 as the rotating axis through a predetermined angle θ, the exit surface 22b and the second focusing lens 23 are inserted in the optical path of the main optical system, as indicated by the dotted lines. In this case, the arm portion 22d is twisted. However, the straight portion 22c is long enough to disperse the twisting force. Even if frequent twisting of the optical guide is performed, the optical guide fatigue is small, and the straight portion 22d can withstand the long-term application.

A mechanism for rotating the arm 22d of the optical guide through the angle θ, comprises, as illustrated in FIG. 7, a swinging mechanism of a crank lever 24 one end of which is engaged with the arm 22d of the optical guide 22 and the other end of which is engaged with a rotation plate 25 through an eccentric pin 26. The rotation plate 25 is rotated by a crank shaft 25a, and a notch 25b formed at the outer periphery of the rotation plate 25 engages with a stopper (not shown) of the housing of the illumination apparatus so as to set the rotation plate 25 at a predetermined angular position, thereby determining the inclination of the arm 22d of the optical fiber.

As is apparent from the above description, the optical guide is arranged parallel to the main optical system so as to perform high-luminance spot illumination, thereby easily performing blooming and smear phenomenon tests of the solid-state image sensor at high speed.

According to the present invention, there is provided a compact illumination apparatus wherein uniform illumination light can be incident on a photoelectric device such as a solid-state image sensor, while the high resolution of the projection objective lens is maintained, and at the same time high-luminance spot illumination can be performed at high speed. According to this apparatus, various precision tests can be made by switching various filters and test charts. Therefore, mass-produced photoelectric transducer devices such as solid-state image sensors can be tested to allow high-quality control.

What is claimed is:

1. An illumination apparatus for testing a photoelectric transducer device, including:
   (a) a main optical system for uniformly illuminating said photoelectric transducer device, said main optical system having a projection objective lens for projecting a pattern image of a test chart member onto said photoelectric transducer device, a light source for supplying illumination light rays to said test chart member, a collimator lens for converting the light rays from said light source to collimated light rays, an optical integrator disposed in the collimated light rays so as to form a plurality of images of said light source, and a condenser lens for forming the plurality of images of said light source on an entrance pupil of said projection objective lens;
   (b) an auxiliary optical system for collecting other light rays excluding the light rays incident from said light source on said collimator lens; and
   (c) adding means for adding said auxiliary optical system to said main optical system;
   wherein said auxiliary optical system comprises a first focusing lens for focusing the other light rays exclusing the light rays incident from said light source on said collimator lens, an optical guide member for guiding the light rays focused by said first focusing lens to a portion between said test chart member and said condenser lens, and a second focusing lens for focusing the light rays from an exit end of said optical guide.

2. An apparatus according to claim 1, wherein said optical guide member includes a straight portion substantially parallel to an optical axis of said main optical system, and an arm bent from said straight portion at the exit end of said optical guide member; and said adding means includes moving means for rotating said arm about said straight portion of said optical guide through a predetermined angle.

3. An apparatus according to claim 2, wherein said moving means includes a crank mechanism.

4. An illumination apparatus for testing a photoelectric transducer device, including:
   (a) a main optical system for uniformly illuminating said photoelectric transducer device,
   said main optical system having a projection objective lens for projecting a pattern of a test chart member onto said photoelectric transducer device, a light source for supplying light rays to said test chart member, a collimator lens for converting the light rays from said light source to collimated light rays, an optical integrator disposed in the collimated light rays so as to form a plurality of images of said light source, and a condenser lens for forming the plurality of images of said light source on an entrance pupil of said projection objective lens,
   said test chart member including a uniform illumination chart plate having a predetermined pattern for testing said photoelectric transducer device under uniform illumination and a spot illumination chart plate with a small opening for testing said photoelectric transducer device under high-luminance spot illumination, said uniform illumination chart plate and said spot illumination chart plate being replaceably disposed interchangeably with each other in the optical path of said main optical system between said condenser lens and said projection objective lens;
   (b) an auxiliary optical system for collecting other light rays excluding the light rays incident from said light source on said collimator lens; and
   (c) adding means for adding said auxiliary optical system to said main optical system when said uniform illumination chart plate is replaced by said spot illumination chart plate, so as to supply light rays collected by said auxiliary optical system to said spot illumination chart plate and so as to perform high-luminance spot illumination by cooperation with said spot illumination chart plate disposed in the optical path of said main optical system.

5. An illumination apparatus according to claim 4, wherein said auxiliary optical system comprises a concave reflecting member disposed opposite to said collimator lens with respect to said light source, said adding means has shutter means removably inserted in an optical path between said concave reflecting member and said light source, said shutter means being removed from the optical path to add said auxiliary optical system to said main optical system.

6. An apparatus according to claim 5, wherein said shutter means comprises a rotary shutter mechanism.

7. An illumination apparatus according to claim 5, wherein said spot illumination chart plate has a rectangular small opening and is movable within the surface of the spot illumination chart plate.

8. An illumination apparatus according to claim 7, wherein said main optical system further includes a wavelength selection filter and a ND filter both removably disposd in the optical path of said main optical system between said collimator lens and said optical integrator.

9. An illumination apparatus for testing a photoelectric transducer device, including:
(a) a main optical system for uniformly illuminating said photoelectric transducer device,
said main optical system having a projection objective lens for projecting a pattern of a test chart member onto said photoelectric transducer device, a light source for supplying light rays to said test chart member, a collimator lens for converting the light rays from said light source to collimated light rays, an optical integrator disposed in the collimated light rays so as to form a plurality of images of said light source, and a condenser lens for forming the plurality of images of said light source on an entrance pupil of said projection objective lens, said test chart member including a spot illumination chart plate with a small opening, said spot illumination chart plate being removably disposed in the optical path of said main optical system between said condenser lens and said projection objective lens;
(b) an auxiliary optical system for collecting other light rays excluding the light rays incident from said light source on said collimator lens; and
(c) adding means for adding said auxiliary optical system to said main optical system when said spot illumination chart plate is disposed in the optical path of said main optical system between said condenser lens and said projection objective lens, so as to supply light rays collected by said auxiliary optical system to said spot illumination chart plate and so as to perform high-luminance illumination by cooperation with said spot illumination chart plate disposed in the optical path of said main optical system.

10. An illumination apparatus according to claim 9, wherein said auxiliary optical system comprises a concave reflecting member disposed opposite to said collimator lens with respect to said light source, said adding means has shutter means removably inserted in an optical path between said concave reflecting member and said light source, said shutter means being removed from the optical path to add said auxiliary optical system to said main optical system.

11. An illumination apparatus according to claim 10, wherein said spot illumination chart plate has a rectangular small opening and is movable within the surface of the chart plate.

* * * * *